United States Patent [19]

Howley

[11] Patent Number: 4,864,230
[45] Date of Patent: * Sep. 5, 1989

[54] PROCESSING QUADRATURE SIGNALS

[75] Inventor: Colin K. Howley, Stonehouse, United Kingdom

[73] Assignee: Renishaw plc, Wotton-under-Edge, United Kingdom

[*] Notice: The portion of the term of this patent subsequent to Jul. 19, 2005 has been disclaimed.

[21] Appl. No.: 133,253

[22] Filed: Dec. 9, 1987

[30] Foreign Application Priority Data

Dec. 9, 1986 [GB] United Kingdom ............... 8629438

[51] Int. Cl.$^4$ .................................... G01P 3/56
[52] U.S. Cl. ........................... 324/161; 324/160; 340/672; 361/239
[58] Field of Search .............. 324/160, 161, 166, 175, 324/163, 178; 361/239; 340/672, 658; 180/179

[56] References Cited

U.S. PATENT DOCUMENTS

| 3,501,651 | 3/1970 | Cottrell | 307/295 |
| 3,597,749 | 8/1971 | Uemura et al. | 340/174.1 |
| 3,629,705 | 12/1971 | Walters | 324/173 |
| 4,199,800 | 4/1980 | Weit | 340/870.37 |
| 4,453,550 | 7/1969 | Kuck | 328/109 |
| 4,468,617 | 8/1984 | Ringwall | 324/165 |

FOREIGN PATENT DOCUMENTS 1528740 10/1978 United Kingdom .

OTHER PUBLICATIONS

Boyes, "Synchro and Resolver Conversion", 1980, Chapter III, pp. 43-78.
Pettavel et al., "Omnisip, a New, Three-Dimensional Measuring Head", Technische Rundschau, 41/86, pp. 178-182, 1986.

Primary Examiner—Reinhard J. Eisenzopf
Assistant Examiner—Anthony L. Miele
Attorney, Agent, or Firm—Spencer & Frank

[57] ABSTRACT

Quadrature input signals from an opto-electronic or magnetic readhead which is movable relative to a periodically marked scale, are respectively multiplied by quadrature reference signals from a reference oscillator in multipliers. The resulting signals are added together in a mixer to give a signal (S) having a frequency which is the reference frequency shifted by the frequency of the input signals. This signal (S) is then compared with the reference signal. The reference signals are generated from a high frequency clock which is subsequently used to compare the period of the reference signal with that of the signal (S), giving outputs which interpolate the position of the readhead within the pitch of the marks on the scale.

12 Claims, 3 Drawing Sheets

PROCESSING QUADRATURE SIGNALS

FIELD OF THE INVENTION

This invention relates to processing quadrature signals in order to derive information from them.

DESCRIPTION OF PRIOR ART

Devices comprising a periodically marked scale and a readhead which is movable relative to the scale in order to determine their relative positions are known for use in position determining apparatus such as co-ordinate measuring machines and machine tools. Various types of such device are known, including magnetically marked scales with magnetic readheads and optically marked scales with opto-electronic readheads. The known readheads commonly have two outputs in quadrature, derived from two or more sensors.

In order that the resolution of such devices is not limited to the pitch of the scale marks, it is known to provide circuits for interpolation between the marks. This problem is complicated by the need to be able to cope with the frequency range of the signals from the readhead, the frequency range extending to DC when the readhead is stationary relative to the scale. The interpolation circuit then needs to be able to detect accurately the minute change in DC level in the signal when the readhead moves by a fraction of the scale pitch to another stationary position.

In some circumstances, it can also be useful to provide an indication of the relative velocity of the scale and readhead, e.g. to permit velocity regulation. This can be determined from the frequency of the signals from the readhead.

It is known, for the above purposes, to provide a device for processing input signals which are in quadrature, comprising: a reference oscillator for generating at least one first reference signal having a reference frequency, and frequency shift means for generating, from the quadrature input signals and the reference signal(s), a second signal which has a frequency being that of the reference signal, frequency shifted by the frequency of the input signals.

For example, U.S. Pat. No. 3,597,749 (assigned to Sony) and U.K. Pat. No. 1,528,740 (Newall) show such devices, which determine positional displacement by comparing the phase of the second signal with that of the reference. Whilst such a system can give useful results, there is an inherent problem in such analogue phase comparison, in that it relies on the stability of the various analogue circuits. If the analogue circuits drift, errors are introduced, and these errors will be cumulative. Furthermore, phase comparison for position determination relies on the readheads being stationary or nearly stationary relative to the scale, and the system cannot be used at speed. This is a disadvantage if, as is usual, it is desired to move the device carrying the readheads to a predetermined position relative to the scale, comparing the current position with the predetermined position whilst on the move. Phase comparison is also suggested in U.S. Pat. No. 3,629,705 (Walters).

A further example of such a device is shown in my co-pending U.S. Pat. application Ser. No. 07/079,452, now U.S. Pat. No. 4,758,787 granted July 19th, 1988. Here, the frequency of the second signal is compared with the frequency of the reference signal. However, this device determines only the frequency of the input signals, giving an indication of the relative velocity of the scale and readhead. U.S. Pat. No. 4,468,617 (Ringwall) shows a similarly limited circuit.

It is an object of the present invention to provide an alternative to such known arrangements.

SUMMARY OF THE INVENTION

The present invention provides a device for processing input signals which are in quadrature, comprising: a reference oscillator for generating at least one first reference signal having a reference frequency, frequency shift means for generating, from the quadrature input signals and the reference signal(s), a second signal which has a frequency being that of the reference signal, frequency shifted by the frequency of the input signals, and means for comparing the length of a period related to the period of the second signal with the length of a reference period related to the period of the reference frequency, and producing an output as a result of the comparison which relates to a parameter of the input signals.

The said output which is produced may be an interpolation signal relating to position within the pitch of the cycle of the input signals. Additionally or alternatively, the output may relate to the frequency of the input signals (which, where the input signals come from a scale and readhead, gives an indication of the relative velocity of the scale and readhead).

BRIEF DESCRIPTION OF THE DRAWINGS

Preferred embodiments of the invention will now be described by way of example, with reference to the accompanying drawings, wherein.

DESCRIPTION OF PREFERRED EMBODIMENTS

Figure 1:
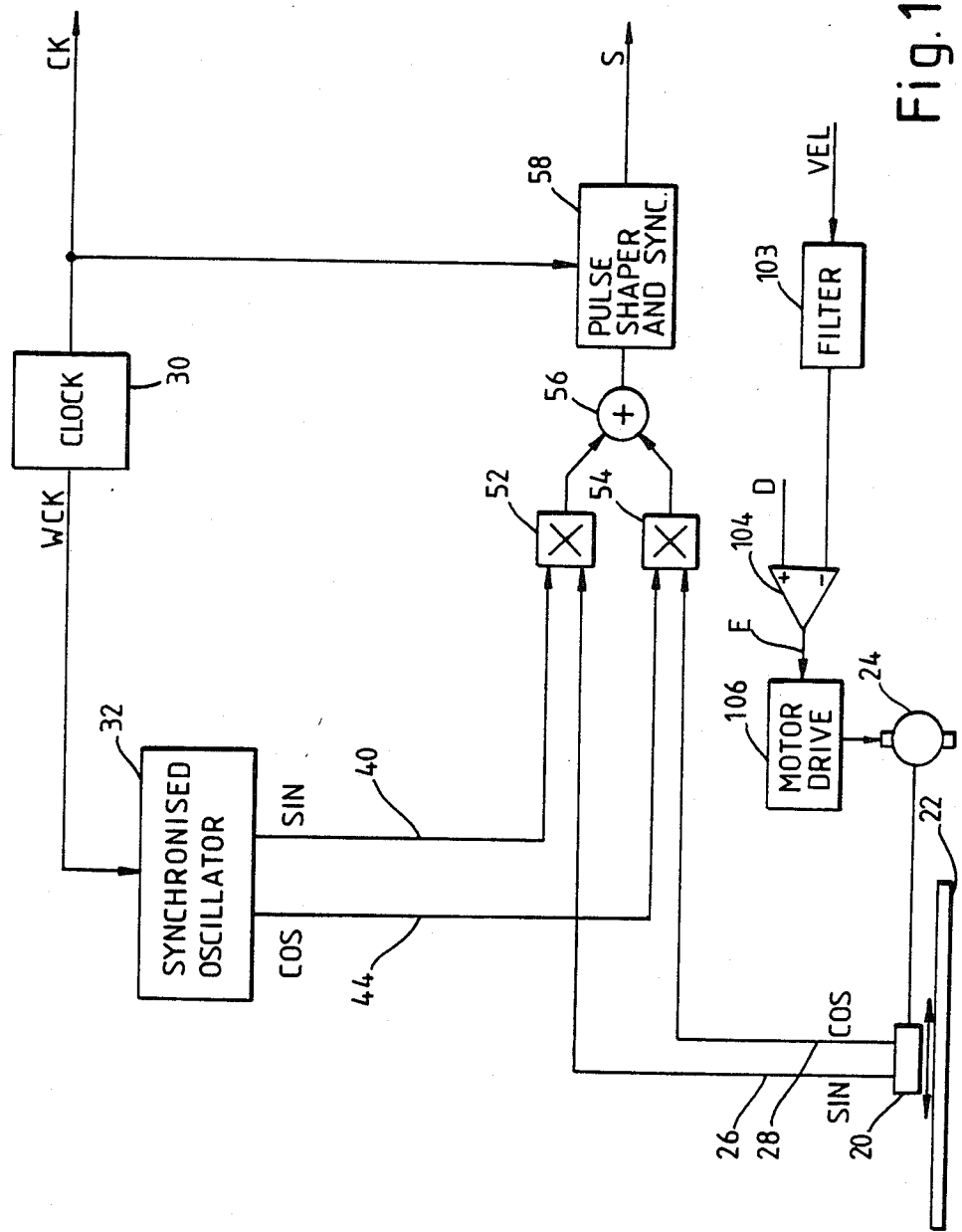
FIG. 1 shows a scale and readhead, with circuitry for the initial processing of the signals from the readhead.

Referring to FIG. 1, a readhead 20 is movable relative to a scale 22 by means of a motor 24. The nature of the scale and readhead is not significant, and they may for example be magnetic or optical. The scale 22 comprises marks laid down at periodic intervals. The readhead 20 comprises at least two appropriate sensors spaced with respect to the scale so as to produce sinusoidal signals in quadrature on lines 26 and 28.

A clock pulse generator 30 provides pulses at a high frequency, say 2 MHz, on a line WCK to drive a reference oscillator 32. The oscillator 32 is synchronised with these clock pulses. It is arranged to provide sinusoidal and cosinusoidal reference signals on lines 40,44 at a frequency $f_{ref}$ which is a sub-multiple of the clock frequency, say 100 kHz.

The synchronised oscillator 32 is not the only way of achieving the same effect. As an alternative, a sine/cosine generator such as a Wien bridge oscillator may be used, with the higher frequency clock 30 being synchronised with the Wien bridge oscillator by means of a phase locked loop arrangement.

The clock 30 has a further output CK which provides clock pulses to the rest of the circuit to be described below. The ratio of the clock frequency CK to the reference frequency on lines 40 and 44 sets the degree of interpolation of the scale/readhead signals which the circuits described below are capable of achieving. For example, if the signal CK has a frequency of 4 MHZ and the quadrature reference signals 40,44 have a frequency $f_{ref}$ of 100 kHz, then the interpolation ratio is 40. That is, the circuit is capable of discriminating a relative movement between the readhead 20 and the scale 22 which is 1/40 of the pitch of the marks on the scale 22. It will be seen that the clock signal CK does not need to be at the same frequency as the clock signal WCK, as long as the clock signal CK is synchronous with the reference signals on the lines 40 and 44. For example, the clock signal WCK may be derived from the clock signal CK.

The sine scale signal (line 26) and the sine reference signal (line 40) are multiplied together in a first multiplier 52. Similarly, the cosine scale signal (line 28) and the cosine reference signal (line 44) are multiplied together in a second multiplier 54. The result in each case is a double sideband signal of the reference frequency $f_{ref}$, amplitude modulated by the scale frequency $f_{scale}$. These two signals are added together in a mixer 56, resulting in a single sideband (SSB) signal, having a constant amplitude and a frequency given by $f_{ref}\pm f_{scale}$. That is, the resulting signal comprises the reference frequency shifted by the scale frequency. The direction of the frequency shift (above or below the reference frequency) depends upon the direction of motion of the readhead 20 relative to the scale 22. Of course, if the readhead is stationary relative to the scale 22, then the scale frequency is zero. In these circumstances, it can be shown that the result of the frequency multiplication is that the output signal of the mixer 56 is at the reference frequency, with a phase shift which depends on the position of the readhead 20 within the pitch cycle of the scale 22. That is, the phase shift will vary from 0° to 360° over one cycle of the scale marking.

It will be appreciated that the same frequency shifting result can be achieved by multiplying the sine signal from the scale with the cosine signal from the reference oscillator 32, and the cosine scale signal with the sine reference signal, and mixing the results.

Other electronic circuits could be used to produce the frequency shifted signal $f_{ref}\pm f_{scale}$ if desired. However, the present circuit is preferred because the multipliers 52,54 may be cheap modulators intended for radio circuits, the outputs of which are such that the mixer 56 may simply comprise a single resistor.

It should be appreciated that other forms of multiplier may also be used. For example in the case of a magnetic scale and readhead, the signals can be multiplied in the two electromagnetic sensors of the readhead. The sine and cosine reference signals are each supplied to an input coil of a respective one of the sensors, as a bias signal. Each sensor also receives a magnetic input signal from the scale, which is multiplied by the reference signal. The electrical outputs of the two sensors are then mixed together to produce a frequency shifted signal.

The output of the mixer 56 is fed to a pulse shaper and synchronising circuit 58. This incorporates a zero crossing detector to convert the sine waves issuing from the mixer 56 into square waves, and produces pulses on an output line S at the frequency $f_{ref}\pm f_{scale}$, synchronised with the clock signal CK.

Figure 2:
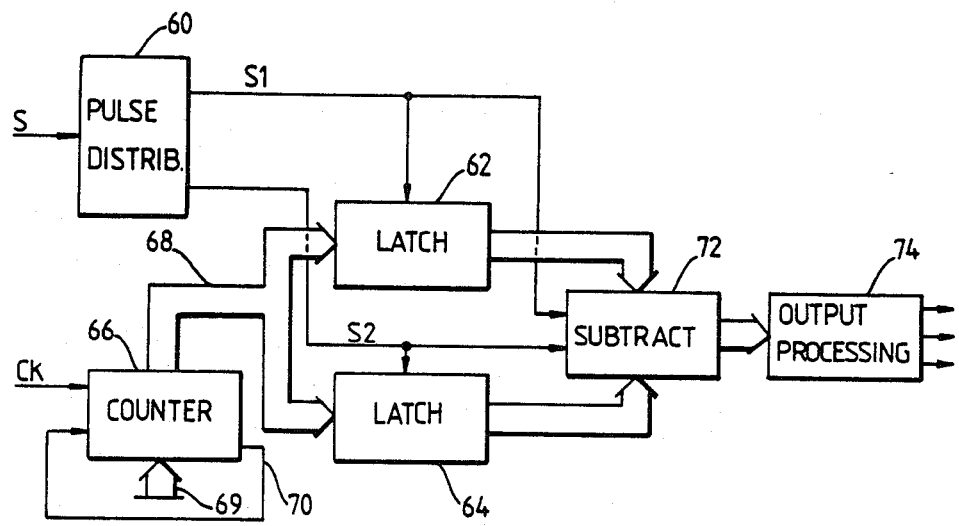
FIGS. 2 and 3 are circuit diagrams of alternative circuits for further processing of the signals produced by the circuit of FIG. 1.

FIG. 2 shows one possible circuit for obtaining the desired interpolated position signal from the pulses which appear on the line S. A pulse distributor 60 distributes the pulses alternately to the trigger inputs of a latch 62 and a latch 64. Both latches receive the binary output of a counter 66 on a bus 68. The counter 66 is clocked by the clock pulses on line CK from the clock 30 in FIG. 1. It has a binary input 69 which is hardwired to a pre-selected binary value which is the same as the desired interpolation ratio, that is 40 in the present example. A connection 70 is provided between the terminal count output of the counter and its load input, so that every time the counter counts down to zero it is reloaded with the binary value pre-set on input 69. Thus, the counter 66 counts in a continual cycle which has the same frequency as the reference frequency $f_{ref}$.

Figure 3:
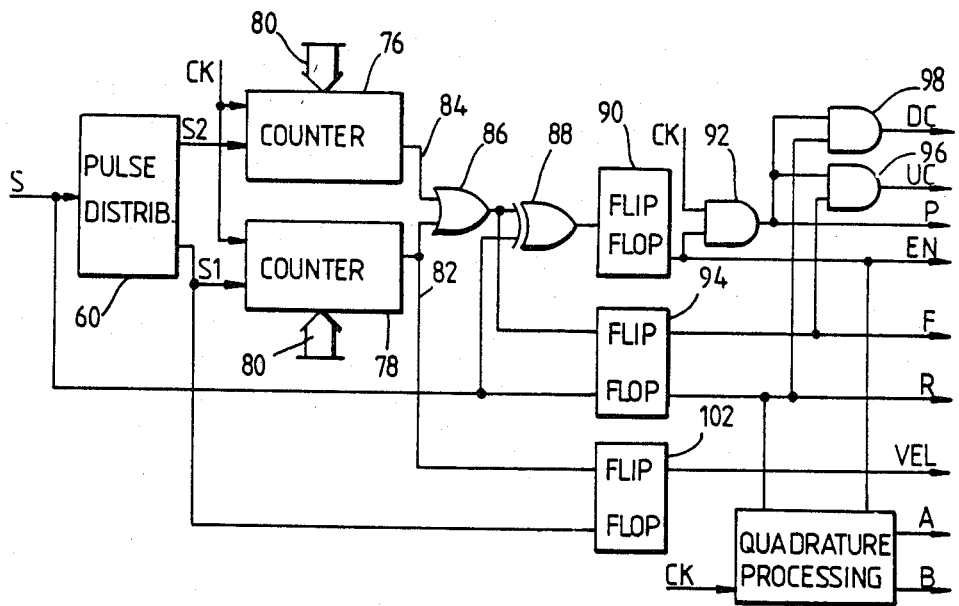
Figure 4:
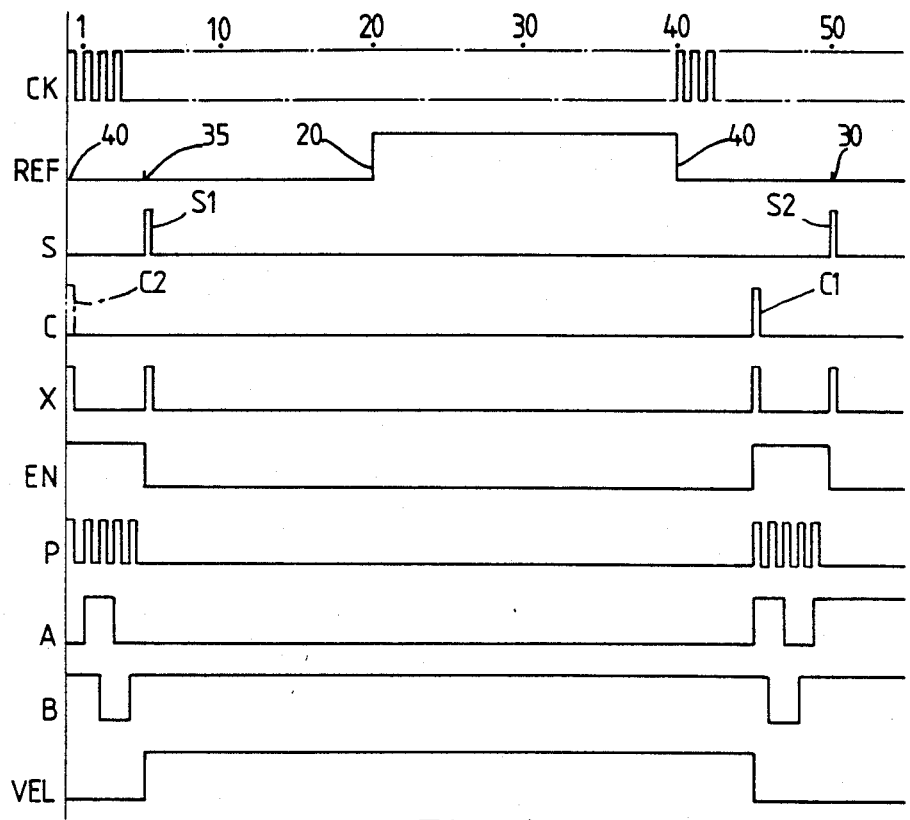
FIG. 4 is a diagram of waveform at various points in the circuits of FIGS. 2 and 3.

Referring to the first three waveforms of FIG. 4, there is shown the train of clock pulses CK which drives the counter 66, and the numbers appearing above this waveform represent a count of the clock pulses. A signal having the frequency fref is shown at REF, though in fact this signal is shown only for purposes of explanation and does not appear in this form anywhere in this circuit. Output values of the counter 66 are indicated at various points on the waveform REF. The pulses appearing on the line S are shown in the next waveform, and of these the pulse S1 is used to trigger the latch 62 while the pulse S2 is used to trigger the latch 64. Therefore, with the example signal timing as shown in FIG. 4, the value 35 is latched into the latch 62 on arrival of the pulse S1, and the value 30 is latched into the latch 64 on arrival of the pulse S2 in the following cycle. A subtraction unit 72 is triggered by the pulse S2 to subtract the output of the latch 64 from the output of the latch 62 (possibly after a slight delay to allow the latch 64 to settle), giving a value of 5 as a result in this example. This is fed to an output processing circuit 74 which provides appropriate output signals indicating the fact that in this cycle of the input pulses on line S, the readhead has moved (in this example) by a distance of 5/40 of the scale pitch. The output processing circuit 74 in FIG. 2 may provide its output in a variety of ways, as illustrated below with reference to FIG. 3.

On arrival of the next pulse S1, the subtraction unit 72 is triggered to perform a similar subtraction, but this time subtracting the new output of the latch 62 from the output of the latch 64. In this way, the output processing circuit 74 receives details of the distance moved by the readhead relative to the scale on arrival of each of the pulses on line S, that is to say in each cycle of the frequency $f_{ref}\pm f_{scale}$. The effect of the counter 66, latches 62,64 and subtraction unit 72 is to compare the period of the pulses S (at the frequency $f_{ref}\pm f_{scale}$) with the reference period of $f_{ref}$, or forty clock pulses, outputting any difference in terms of numbers of clock pulses.

The timing shown in FIG. 4 illustrates the case where the readhead is moving in a first direction relative to the scale, such that the reference frequency fref is shifted downwards by the multipliers 52,54 and the mixer 56, so that the period between the pulses S is greater than the period of the reference frequency. As a result, the values output by the subtraction unit 72 are positive. However, it will be appreciated that the subtraction unit 72 can cope perfectly well with the signals which result from the readhead moving in the opposite direction, in this case outputting negative values. The result is that the output processing circuit 74 simply needs to count or add together the successive positive or negative output values of the subtraction unit 72 in order to keep track of the current whereabouts of the readhead relative to the scale.

When the readhead is stationary relative to the scale, the pulses S arrive at the same frequency as the reference $f_{ref}$, so the result of the subtraction is zero. If the position of the readhead is now incremented by 1/40 of the scale pitch, to an adjacent stationary position, then because of the synchronous nature of the pulses S relative to the clock pulses CK, it follows that no matter how slowly this movement is performed, the circuit will have no difficulty in detecting that the signal S has jut undergone a phase shift by the value of a single clock pulse, and the subtraction unit 72 will output the necessary value 1 or −1 to the circuit 74. Accordingly, it can be seen that the circuit has no difficulty coping with a wide frequency range, right down to DC levels. It is thus easy to keep a count of the absolute position of the readhead relative to the scale.

The circuit in FIG. 2 is however not preferred because the latches 62,64 and the subtraction unit 72 are relatively expensive to provide. Accordingly, we prefer the circuit of FIG. 3.

In FIG. 3, the pulses on line S are distributed by a pulse distributor 60 in the same way as FIG. 2. However, instead of being fed to latches 62,64 they are applied to the load inputs of respective counters 76,78. Arrival of the respective pulse S2 or S1 at the counter 76 or 78 causes it to load a pre-selected value from an input 80, in the same manner as the counter 66 in FIG. 2. The pre-selected value is the same as the interpolation ration, e.g. 40, as previously.

On receipt of the pulse S1, the counter 78 counts down at the rate of the clock pulses CK until it reaches 0. It then issues a pulse on a line 82. This is shown as the pulse C1 in waveform C in FIG. 4. The alternate pulses S2 act similarly on the counter 76, to give pulses on a line 84, and FIG. 4 shows such a pulse C2.

The output pulses C1 and C2 from the counters are gated together by an OR gate 86. If the readhead and scale are moving relative to each other at a speed and direction such as to give the timing shown in FIG. 4, the result is a pulse waveform having the same frequency as the input pulses on line S, but delayed by a period of time corresponding to 40 clock pulses (i.e. The period of the reference frequency). With the example timing of FIG. 4, the pulse C1 occurs shortly before the next pulse S2, and similarly the pulse C2 occurs shortly before the next pulse S1. However, if the readhead were stationary, the pulse C1 would coincide with the next pulse S2, and if the readhead were travelling in the opposite direction, it would occur after the next pulse S2.

The combined counter output pulses C1 and C2 are gated with the input pulses S in an exclusive-OR gate 88. The result is an shown in waveform X in FIG. 4. These resulting pulses are fed to a flip-flop 90, the output of which is as shown by the waveform EN. This signal EN is used as an enable signal to an AND gate 92, the other input of which receives clock pulses CK. The result is a pulse output on a line P (waveform P in FIG. 4).

The number of clock pulses occurring during the time that the enable signal EN is high, as output on line P, is a direct indication of the time difference between the occurrence of the pulses on line S and the output pulses C1,C2 of the counters 76,78. In a similar fashion to the circuit of FIG. 2, therefore, the number of these pulses represents the number of clock pulses CK occurring during the difference between the period of the pulses S and the period of the reference frequency (because the counters 76,78 output the respective pulses C1,C2 after a period of time equal to the period of the reference signal). Therefore, if there are five clock pulses occurring during the time that the signal EN is high, as shown in FIG. 4, it follows that the readhead has moved by 5/40 of the scale pitch during the period between the pulse S1 and the pulse S2. The number of output pulses occurring on the line P is an exact count of the number of fortieths of the scale pitch moved by the readhead.

Because of the exclusive-OR function of the gate 88, this gate will produce no output if the pulses S and the pulses C are coincident. This will occur when the readhead is stationary, that is when the frequency of the pulses S equals the reference frequency. This ensures that the line EN is kept low throughout the time that the readhead is stationary, ensuring that there are no output pulses on the line P.

Although the number of pulses on the line P indicates the distance travelled by the readhead, it does not indicate the direction travelled. This is determined by a flip-flop 94, which has one input connected to receive the output of the OR gate 86 (i.e. The pulses C1 and C2) and the other input connected to receive the input pulses S. This flip-flop effectively determines whether the pulses S precede the pulses C, or whether they follow the pulses C as shown in FIG. 4. When the readhead is travelling in a forwards direction, the flip-flop 94 produces a signal on a line F which is identical to the signal EN. Should the readhead be travelling in the reverse direction, the output on the line F is inverted with respect to the signal EN. In either case, the flip-flop 94 produces an output R which is the inverse of the output F. Thus, the lines F and R (when taken in conjunction with the line EN) indicate the direction of travel. The signals F and R may if desired be gated in respective AND gates 96,98 with the output pulse signal P, to give pulse signals on an output line UC when the readhead is travelling in the forwards direction, and on a line DC when it is travelling in the reverse direction. These outputs may respectively be fed to the up count and down count inputs of an external counter, which will then at all times indicate the absolute position of the readhead on the scale. This absolute position will not merely be the absolute position within a single scale pitch, but the absolute position from one end of the scale to the other can be indicated, to a resolution of 1/40 of the scale pitch.

It is desirable that a circuit such as described may be retro-fitted to an existing co-ordinate measuring machine or machine tool. Such as existing machine may be providing with a counter which expects to receive inputs in quadrature, i.e. The same type of input as might be produced directly by the readhead 20 after suitable squaring. Accordingly, the circuit may be provided with a quadrature processing circuit 100 to produce just such an output on line A and B. The output waveforms on these lines are shown at A and B in FIG. 4. In effect, the signals A and B have between them one edge (leading or trailing) for each of the output pulses on line P. The external counter of the machine determines the position of the readhead by counting these edges. It determines the direction of travel of the readhead by determining whether the signal A leads or lags behind the signal B. It will be noted that the signal on lines A and B is not regular, but provided the external counter is edge-triggered this does not matter. The circuit 100 can be made up of simple digital circuits, in an entirely straightforward manner, and so need not be described further. As seen in FIG. 3, the circuit 100 can provide the necessary outputs from the enable signal EN and the clock signal CK with an input from the line R (or F) to indicate the direction of travel.

The circuits described thus provide a highly accurate and repeatable interpolation of the input signal from the scale and readhead. The output from the circuit gives an accurate count of absolute position, anywhere on the scale, and is not limited simply to indicating position within one scale pitch. They can cope with a wide range of input frequencies (corresponding to a wide range of relative speeds between the scale and the readhead). Moreover, special readheads are not necessary. Nearly all the circuitry is cheap digital circuitry, which is not subject to analogue drift, and which lends itself to integration in an integrated circuit, thus reducing production costs.

For best results the input signals on lines 26 and 28 should be free from distortion (that is, they should be accurately in quadrature, accurately sinusoidal and free from DC offsets). However, the small errors introduced if such distortions are present cancel out over one cycle of the scale pitch and are not cumulative. Often, therefore, it will not be necessary to correct for such errors. However, if any such distortion is repeatable (i.e. if the resulting errors are always the same at a given position within each scale pitch), and if error correction if desired, the circuit of FIG. 5 can be used.

Figure 5:
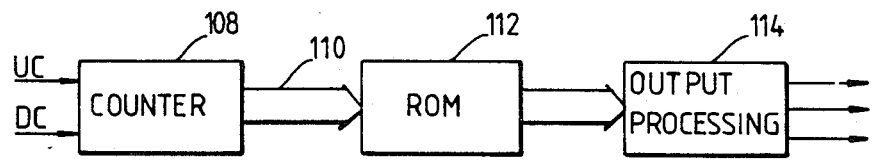
FIG. 5 is a diagram of an error correction circuit.

In FIG. 5, a counter 108 receives the up count and down count outputs UC and DC from FIG. 3. The counter 108 counts modulo N, where N is the chosen interpolation ratio (40 in the above example). It produces a parallel output 110, representing the interpolated divisions within the scale pitch. Because of the distortion, these divisions will be unevenly spaced, by known amounts. The counter output 110 is used to address a read-only memory (ROM) 112. The ROM contains a mapping of the errors which occur over one scale pitch. Each address of the ROM contains a corrected value for the corresponding input from the counter 108. This can be fed to an output processing circuit 114, which if desired can produce outputs of a similar nature to those of FIGS. 2 and 3. It will be appreciated that if the outputs of the ROM 112 and of the output processing circuit 114 are to represent equal divisions of the scale pitch, and are to produce this from the unequal divisions represented by the output 110 of the counter 108, then the ROM will need to contain a many-to-one mapping. The "internal" interpolation ratio N of the circuits of FIGS. 1 to 3 and of the counter 108 will need to be higher than the desired final interpolation ratio to allow for this. However, with a sufficiently high internal interpolation ratio (several times the desired final ratio) it is possible successfully to map the errors produced by grossly distorted input signals 26,28, e.g. if they have a known triangular shape.

Referring again to FIG. 3, it may be desired to provide an output indicating the velocity of the readhead. This may be provided by a flip-flop 102, whose two inputs receive respectively the input pulses S1 and the output pulses C1 of the counter 78. The resulting signal VEL is shown in FIG. 4, and is a square wave whose mark/space ratio depends on the velocity, being 50/50 when the readhead is stationary, and greater or less than this when it moves in the forwards or reverse directions. Thus, the output signal VEL relates to and is indicative of the input frequency $f_{scale}$. The flip-flop 102 effectively compares the period of the pulses S1 with the period of the reference frequency.

The velocity signal VEL may be smoothed by a low pass filter 103 (FIG. 1) and compared by an amplifier 104 with an external demanded velocity signal D from a manual or computer control, to generate an error signal E used to control a velocity input of a motor drive circuit 106 of the motor 24. In this way, closed loop control of the relative velocity of the readhead and scale is achieved.

I claim:

1. A device for processing input signals which are in quadrature, comprising:
    a reference oscillator for generating at least one first reference signal having a reference frequency,
    frequency shift means for generating, from the quadrature input signals and the reference signal, a second signal having a frequency equal to that of the reference signal frequency shifted by the frequency of the input signals, and
    time period comparing means for comparing the length of a period related to the period of the second signal with the length of a reference period related to the period of the reference frequency, and producing an output as a result of said comparison which relates to a parameter of the input signals.

2. A device according to claim 1, including a signal generator which generates a third signal at a higher frequency than the reference frequency but synchronised with the reference frequency so that there are a predetermined number of periods of the third signal in one period of the reference frequency, the third signal being used by the comparing means to perform said comparison.

3. A device according to claim 2 in which the reference oscillator generates the reference signal from the third signal.

4. A device according to claim 2 in which the comparing means includes means for determining the number of periods of the third signal by which the period of the second signal differs from the period of the reference frequency, and for producing a said output in dependence on the result of the determination.

5. A device according to claim 4 in which the determining means includes a counter for counting said predetermined number of periods of the third signal.

6. A device according to claim 5, in which the counter counts said predetermined number of periods in a continuous cycle, and the determining means includes means for latching the output value of the counter at a predetermined point in each of two successive cycles of the second signal, and means for subtracting one said latched output value from the other.

7. A device according to claim 5 in which the counter commences counting said predetermined number of periods at a predetermined point in one cycle of the second signal, and in which the determining means determines the number of periods of the third signal occurring between the end of the count and a corresponding predetermined point in the next cycle of the second signal.

8. A device according to claim 4, in which the said output is used to address a memory containing a map of errors in the said output, and a corrected output signal is derived from the memory.

9. A device according to claim 1, in which the input signals are derived from a readhead movable over a periodically marked scale, and the said output provides position interpolation within the pitch of the scale.

10. A device according to claim 1 which produces a said output which relates to the frequency of the input signals.

11. A device according to claim 1 in which the reference oscillator generates two said first reference signals in quadrature.

12. A device according to claim 11 in which said frequency shift means comprises two multipliers, each multiplying a respective input signal with a respective reference signal, and means for adding together the outputs of the two multipliers.

* * * * *